US007161720B2

(12) United States Patent
Erickson et al.

(10) Patent No.: US 7,161,720 B2
(45) Date of Patent: Jan. 9, 2007

(54) EMBEDDED INFORMATION CARRIER FOR OPTICAL DATA

(76) Inventors: Ronald R. Erickson, 215 Berkeley Pl., Brooklyn, NY (US) 11217; Joel N. Bock, 1321 Hastings St., Teaneck, NJ (US) 07666; Eliezer D. Sandler, 1173 E. 29th St., Brooklyn, NY (US) 11210

(*) Notice: Subject to any disclaimer, the term of this patent is extended or adjusted under 35 U.S.C. 154(b) by 0 days.

(21) Appl. No.: 10/822,044

(22) Filed: Apr. 9, 2004

(65) Prior Publication Data

US 2004/0201873 A1    Oct. 14, 2004

Related U.S. Application Data

(60) Provisional application No. 60/462,566, filed on Apr. 10, 2003.

(51) Int. Cl.
*G03H 1/00* (2006.01)
(52) U.S. Cl. .............. 359/2; 359/15; 430/10; 428/29; 428/916; 356/71; 283/86

(58) Field of Classification Search ............ 359/2, 359/15; 430/10; 283/86; 428/29, 916, 216; 356/71
See application file for complete search history.

(56) References Cited

U.S. PATENT DOCUMENTS

| 4,171,864 | A  | * | 10/1979 | Jung et al. ............... 359/2 |
| 5,825,547 | A  | * | 10/1998 | Lee ........................ 359/567 |
| 6,271,967 | B1 | * | 8/2001 | Stork ...................... 359/567 |
| 6,280,891 | B1 | * | 8/2001 | Daniel et al. ............. 430/10 |
| 6,369,919 | B1 | * | 4/2002 | Drinkwater et al. ........ 359/2 |
| 6,697,179 | B1 | * | 2/2004 | Hsiao ..................... 359/2 |
| 2004/0233485 | A1 | * | 11/2004 | Moon et al. .............. 359/2 |

* cited by examiner

*Primary Examiner*—Leondas Boutsikaris

(57) ABSTRACT

In a system for authenticating information, a holographic element, including a first layer of optical information in a first coded pattern and a second layer of optical information in a second coded pattern is inserted into a reader. The reader includes an opening into which the holographic element may be positioned, a light source, a first detector positioned at a first predetermined distance from the location of the holographic element when the holographic element is positioned in the opening, and a second detector positioned at a second predetermined distance from the location of the holographic element when the holographic element is positioned in the opening.

22 Claims, 15 Drawing Sheets

EMBEDDED INFORMATION CARRIER FOR OPTICAL DATA

CLAIM TO PRIORITY

This application claims priority from U.S. patent application Ser. No. 60/462,566, filed on Apr. 10, 2003.

FIELD OF THE INVENTION

The present invention relates to holographic, diffractive and optically variable security features, methods for creating such security features, and apparatus, systems, and methods for verification of such security features. More specifically, the present invention relates to optically variable security features having embedded therein optical security information, including multi-layer and multi-wavelength security information, methods for manufacturing such security features having embedded optical security information, and devices, systems, and methods for reading or verification of the embedded optical security information in such security features. The present invention also relates to security features that are non-removable or self-destructing upon removal.

BACKGROUND OF THE INVENTION

Currently, there are a variety of optical devices for adding a level of security to articles of value or identification, including documents, currency, identification cards, passports, computer software, drivers licenses, authentic products, and credit cards, to name just a few. For example, almost all credit cards currently include a holographic seal. The same is true for the new U.S. Passports, some denominations of U.S., including the twenty dollar bill, and foreign currency, computer software packaging, and official major league baseball merchandise, which each include some form of holographic seal or optical security feature. Because of the relative difficulty in the past of producing these types of holographic seals and optical security features, this added feature provided an increased level of security and added significant cost and effort for those trying to create forgeries or counterfeit items.

For the last eighteen years holographic seals have been used with good results and little worry. During this time, however, the fabrication technology for holograms has become more sophisticated and more automated, giving those who would seek to counterfeit or forge these instruments new and advanced tools to duplicate even the most complex holographic seals and optical security features used on currency, passports, credit cards, and other items.

The present use of holographic seals as a security feature has been compromised by these new fabrication technologies, and some of the forgery holograms are even of a superior quality as compared to the legitimate item that is being manufactured and used for security purposes. For example, the popular bird hologram that is in use on Visa® brand credit cards as a security feature, can now be easily reproduced by forgers for minimal cost. This is in part a result of the availability and low cost of the equipment and technology necessary for preparing the forgeries.

As a result, holographic seals and existing optical security features have little deterrent effect on the sophisticated forgers and counterfeiters. Credit card companies and other certifying entities have been forced to take alternative steps and use other methods to attempt to provide the needed security and guarantee authenticity.

Similarly, as a result of the availability of these fabrication technologies, the embedded hologram feature on the new U.S. currency has been compromised leading to the successful forgery of such currency.

There is a significant need for security features that will provide a deterrent effect to forgery and counterfeiting. There is also a need for security features that are relatively inexpensive compared to the cost for creating a forgery or counterfeit item. There is also a need for security features that require a significantly larger investment for unauthorized duplication or copying than the benefit obtained or profits derived from the forgery or counterfeit item that is created.

SUMMARY OF THE INVENTION

The present invention solves the problems associated with the prior art security features by adding additional levels of security and/or new security features that are extremely difficult, expensive and are not cost effective to reproduce by a forger or counterfeiter.

The present invention teaches a device, namely a security hologram or holographic seal that provides additional security features for purposes of authenticity verification. More specifically, the present invention provides a security hologram or holographic seal that includes additional information that is not readily perceived or identified by a forger or a counterfeiter. The additional information provided in the security hologram or holographic seal may include additional multi-depth information, multi-image information, out-of-band information, binary information, or other coded information, or any combination of these various types of information.

The present invention also teaches methods of making and fabricating the security holograms and holographic seals of the present invention, and an apparatus and method for reading the security holograms and holographic seals of the present invention. For example, adhesive that is used to apply the security seal may intermingle with the material to which it is applied creating a fingerprint that is detectable using, among other things, an infrared wavelength.

The present invention also teaches a device, namely a security hologram or holographic seal that provides additional security features for purposes of authenticity verification by adding identifying information, for example, information relating to the bearer, including among other things, biometric and personal information.

The security holograms according to the present invention may include additional optical information, for example, information which can function as a check digit or a series of check digits for a serial series of the object being secured, such as, for example, a credit card or document, as a repository of serialized information or individualized information that is subject to confirmation via an external database, as an indication of time or location data with respect to the creation of the seal or the object being secured, or as additional information for security purposes. The additional optical information may be in digital form and may be readable by the presentation of light of a predetermined wavelength and/or light at a predetermined angle with respect to the surface of the seal. The light may be of either or both visible and non-visible wavelengths. The additional optical information may provide a single value or multiple values to the optical sensor system, or a range of values to the optical sensor system, one of which is the correct value for the individual location in a matrix as determined by independent data values made available to the machine reader from other information provided by one or more of a remote database, the document or object, an embedded program, and biometric or other information of or from the bearer.

The security holograms according to the present invention may include multi-depth information. This includes different groups of information that are projected in different three-dimensional planes and/or different groups of information that are read from different locations. A coded password could be designed into the security hologram with different pieces of the code included in different planes as projected by the security hologram and/or readable from different locations with respect to the position of the security hologram. The division of the coded password into different planes allows the password to be incorporated into a matrix, which adds significantly more levels of complexity and makes it much more difficult to forge or counterfeit. The coded password may be comprised of a single type of information or various types of information. For example, the information may be coded using, for example, binary data, reflective wavelength, reflectance strength, reflection angle, or any combination thereof.

The optical information embedding technique can use, for example, current embossing techniques enhanced by the addition of a number of spots to the hologram image field that can contain security data or that can block data, thereby varying the data being read. Each of the spots is a "digit" location and/or causes the absence of a data point, and the security hologram may have in excess of 1000 of such "digits." The particular digits to be used for identifying a particular seal or serialized object may be determined by the information contained in the remote database, by the object, by an embedded program, the biometrics of the bearer, and/or independent information provided by the bearer.

Additionally or alternatively, each of the "digit" locations, portions of the security hologram or the entire security hologram may be manufactured with a structural condition, for example, with a fragile foil backing, which would defeat removal for copying. Such a fragile foil process could reduce copying by providing upon final lamination a post-production step that could fracture the foil or damage the hologram, using a laser pulse, such that a selected digit or series of digits would not be readable in the finished object or document. The selection of digits may be made in any way, and it would make each object or document unique within the holographic seal. These advances will make the design process much more complex and render the cost of counterfeiting very high. For example, because several hundred separate cards in the same series would have to be acquired and subjected to sophisticated analysis before a counterfeit holographic seal could begin to be fabricated for use on more than a single account. The digit locations, portions of the security hologram or the entire security hologram may be manufactured using a chemical process such that upon removal or the attempted removal of the security hologram a chemical reaction will destroy or render all or parts of the security hologram or digit locations unreadable. This chemical process may be something, such as, for example, an oxidation process or oxidizing agent Alternatively, the entire laminated hologram may be manufactured using a "fragile foil" base. A pattern of spots, for example, holes, is then written into the hologram, for example, using laser pulses, which will serialize the individual seal. This can be accomplished as the last step of the process or at any other point of the hologram production process. The seal may be read using a reader that incorporates a matrix of detectors where the pattern of spots in the optical pattern of the hologram corresponds to the check digits needed to validate the individual card or document. The locations sampled by the matrix of detectors may also be controlled by a predetermined code entered into the detector using a pin number or password known only to the card holder or document source. Without such code the reader will not be able to read the information on the hologram, and with the wrong code, the reader will read the wrong information. Because of the significant difficulty of duplication, a breach of security or theft of a card will allow a counterfeiter, and only one that is highly sophisticated and knowledgeable in holographic techniques, at best, a limited time period of access to the account associated with the stolen card.

Another option is to impose surface defects in a structured pattern within the security hologram or holographic seal such that certain data may be obscured, which would represent the information that is modified for purposes of effecting a code change. This information could be read by detectors positioned at any one or more of a variety of locations and the decoding would depend on the location. The pattern that would be created would be uniquely random such that wear and other damage to the security hologram or holographic seal would not be realistically capable of replicating such pattern.

The security hologram or holographic seal may also incorporate information about the bearer of the item. For example, the seal incorporated into an identification card, such as, for example, a driver's license or passport, could include digital information sufficient to generate a photograph or video of the bearer on a display, or in hard copy. Because of the difficulty in reproducing the seal by incorporating the digital information about the bearer into the seal, replacement of such information will require reproduction of the entire seal including all of the coded information. Thus, subversion by replacing the bearer identifying information will be much more difficult with respect to the present invention than the simple replacement of the bearer's photograph as is currently possible with conventional identification cards and passports. Additionally or alternatively, the security hologram or holographic seal may include a pin or pass code, biometric information, and/or other identifying information relating to the bearer. Such information could be compared to real time data obtained from the bearer upon presentation of the identification card.

In a very high security application, the system could provide for a greater level of security by adding a modification element. The system upon each validation of a holographic seal or security hologram would immediately after, or concurrently, modify the holographic seal or security hologram to provide a different security code. The system would then modify the database of verification data accordingly. For example, the pattern of spots on a fragile foil hologram would be modified upon each use of the identification card to change the security code, using a pulsed laser, with the database of security information being correspondingly updated. For example, the pulsed laser could burn one or more spots or take one or more nibbles out of the pattern, or a device could be used to change the angle of reflection thereby modifying the pattern and information contained therein. The database would be correspondingly modified to include the new pattern or information so that upon the next decoding a correct match could be achieved. This process would continue for each use until there remain no additional modifiable elements in the pattern. With this type of arrangement, the security card would need replacement after a finite number of uses, for example, one thousand uses. This system would not provide for the existence of a duplicate security card for an individual since access would be denied unless the modified card is used. In the event that a forgery is successfully made of the security card, the forger would have to use the forged security card before the real security card is again used. If after the point that the forgery is made, the real security card is utilized first, the forged card would be recognized as being out of sequence and the bearer of the forged card would not be allowed access. If the forger utilizes the card first then the bearer of the original card will be denied access to the system, and can advise the security department accordingly. Upon a detection of an inaccurate security card, the system can automatically activate an alarm or notification function, indicating that an unauthorized use of the security card has been attempted, and that a security lockdown should be initiated. The system may require use of the security card for both entry and exit, thereby adding an even greater level of security. The system may include the requirement of a pin or pass code, biometric information, and/or bearer identifying information verification in addition to a security card.

Because light of IR and UV wavelengths have very different needs in a laminated hologram "mirror," the holographic seals or security holograms need not bear an image visible to the human eye, but instead may include an image that is non-visible, but that is able to be read using IR and/or UV detectors. The image in the seal or security hologram is generated using IR and/or UV light. The reading of the embedded information is accomplished using an IR and/or a UV light source and the reflected light is read using an IR and/or UV detector or detectors. The holographic seal may be embedded in any location on the face of the security card. Such location may be the first series serialization of the security card. The check digits on the holographic seal may be the second series serialization on the security card. The custom, unique, serialization for the individual card may be, for example, the wavelength, response, location, or the binary digit spots.

The security cards may be implemented as a seal that has machine readable embedded information. These seals may be used in conjunction with existing credit cards or serialized to produce the effect of an extended serial number. The seal information may operate in conjunction with the existing serialization. For example, the 15 or 16 digit account number on a credit card is now augmented by the "Series" number that is incorporated on the credit card (but not in the MagStripe Information) to produce an account number of 18 to 20 digits. The seal would add additional digits to the existing serialization for each account, even though there would be a fixed number of digits on all of the seals provided.

The security cards may be implemented by incorporating a data subtraction function. Under this method, a large number of active data points are included in the manufactured seal. Upon activation or use of the card or document, a unique set or sets of data points is removed ("after removed" data points) to provide the unique serial data within the seal to add an additional security layer or for individualization of each seal. This data point information along with other serial data in the same or other modalities on the card, document, or other object may be entered into a master database for real-time, near real-time, or delayed confirmation.

Alternatively, the information included in the seal may already have a series of data points removed ("embedded removed" data points), for example, with the angle of reflection or refraction varied from the after removed data points so as to differentiate the coded data added at a later point in time from the static data that is pre-existing on the seal. The difference between the embedded removed data points and the after removed data points may provide the identifying security information or individualization.

The security hologram may incorporate varying reflection angles into the digit locations. Each digit location could incorporates a predetermined reflection angle such that each bit of the unique code would be reflected at a particular angle to be read by a particular detector. Each digit location of the unique code would be able to represent more than binary ones and zeros, but can represent any number of digits depending on the number of detectors used. For example, if five detectors are used, either none or any one of the five detectors can detect a digit upon illumination of the digit locations. The five detectors, for example, may each be located at a particular position with respect to the security hologram. Upon illumination, each individual digit location would be reflected to a particular location to be detected by a detector in the corresponding position, thereby providing for a greater number of unique codes utilizing fewer digit locations. An eight digit code incorporated into the security hologram would contain six times as much information as a binary eight digit code utilizing a single detector with no angular differentiation. Such a security hologram is much more difficult to reproduce due to the specific and defined reflection angles required for the digits in the security hologram to allow for an accurate reading of the code.

Alternatively or in addition, there may be incorporated in the security hologram or holographic seal decoy data angles that would project information to a particular location but that would not include the coded information, but instead would included decoy information. This can be in addition to or in place of the decoy data points.

The security hologram may also or alternatively utilize out of band information. For example, the reflected signal may include a primary peak wavelength and a secondary peak wavelength. The system according to the present invention may utilize the secondary peak as the detected signal for purpose of coding the identification information or the system may use any combination of the primary, secondary and any other peaks for purposes of coding the identification information.

The security hologram may include multi layer data points that reinforce the data signal only at predetermined angles, thereby producing amplitude differences in the information presented to the reader without the need for highly precise fabrication of the security hologram.

The reader may incorporate software containing one or more algorithms that may be time based and volatile and, depending on the time (day, week, month, hour), may decrypt the security information in the seal or security hologram to a different code. Such code would then be decipherable based on one or more of the algorithms in the software.

The security information in the seal or security hologram may be structured as a three dimensional matrix, for example, 20×20×20 bit or byte. The information contained in the three dimensional matrix may be read using a matrix of detectors arranged in a corresponding three-dimensional configuration, or in a two-dimensional configuration, or it may be read using one or more groups of two- or three-dimensional configurations of detectors. The order in which the detectors are read may be controlled by a first algorithm and the information read by the detectors may be decoded using a second algorithm. The specific algorithms that are used are not critical and, in fact, any algorithm from the most simple to the most complex may be used for purposes of reading, coding and/or decoding the security information embedded in the seal or security hologram. The detectors may be toggled, controlled or arranged to provide a variety of configurations for detection and/or decoding of the information stored in the seal or security hologram, and may be adaptable to variations or changes in the algorithms or control information for verification purposes. For example, if there has been a verified or assumed breach of the database, theft of a security card and/or decryption of the algorithm and/or codes, the system may be placed into breach mode whereby a new matrix for decoding is utilized. This may be based on an algorithm stored in a different secure location and may utilize alternative information stored in the seal or security hologram, different angles, or different wavelengths of light, such as, for example, out of band information, multi-depth information, and/or multi-image information, for purposes of decoding and verification.

In the configuration where the detectors are located in a single plane, the seal or security hologram may be read linearly (by swiping) or in parallel fashion (by inserting). The detectors may be located at different positions in a single plane. Each detector represents a decimal, such that a single detector would be used where the coded information is represented in binary format, seven detectors would be used where the coded information is represented in octal format, etc. The greater the number of detectors, the greater the difficulty to generate and to copy the seal or security hologram, because of the criticality of obtaining the correct angles of reflection of the light required for proper reading of the information stored in the seal or security hologram.

The security information or some other access code or codes may be programmed onto the magnetic strip on a security card or other form of identification using holography, as taught by U.S. Pat. Nos. 4,547,002, 4,597,814, 4,684,871, 5,336,871, 5,634,669 and 6,086,708, incorporated herein by reference. The security information may be read by swiping the card through the card reader. The reader may include detectors for reading the security information or other access code that may be positioned at a predetermined angle, at a different angle for each detector, or any combination of angles. For each angle at which a detector is arranged, a different code may be detected. Using detectors arranged at different angles an algorithm may be used to control the reading or processing of the security information, provide for a particular order of detection and/or read the detected information in various sequences. This may produce a different code depending on the time, day or some other temporal factor.

The security information may be processed at or near the location of verification of the seal or security hologram, for example, at the store checkout counter. The security information may also be processes by sending the raw data to a remote location where the matrix may be decoded. The decoding may include, for example, utilization of an algorithm, or a comparison to personal information or biometric information. An additional security layer or feature includes the addition of a second layer of security information, for example, adding a pin number which when entered by the bearer sets the algorithm for purposes of decoding. A new pin number may be released to the bearer upon acceptance or completion of the transaction.

A remote or local database containing bearer information may be utilized for purposes of verification of the security information in the seal or security hologram, and may include various information, including, for example, an image of the bearer, physical information or historical information, such as, for example, birth date, birth location, mother's maiden name, etc.

Different levels of security may also be provided on the read side. For example, the reader may be controlled by software, a code, a remote device, or some other automated or manual input which determines the algorithm to apply for purposes of decoding the information stored in the seal or security hologram, or which controls the detectors or layers of detectors that will be activated or deactivated for purposes of reading the information contained in the seal or security hologram. Various combinations of these security features may be used for purposes of controlling access to the information in the seal or security hologram and for ensuring the proper reading of the stored information.

Added levels of security may be implemented. For example, a security feature based upon the use of a transponder or other information carrier embedded within the proper bearer of the seal or security hologram may be included in the system according to the present invention. This information carrier may be activated upon entry into the secure location and may be required for the bearer to exit such location. The information carrier may be activated by a specific code or algorithm and, therefore, may not be detectable until such activation occurs. Upon proper exit from the secure location, the information carrier may be deactivated by the same or different specific code or algorithm. Alternatively, the information carrier may be continuously active or active for predetermined periods of time. For example, the information carrier may be active prior to entry into the secure location and may be required for purposes of verification of the bearer information in the seal or security hologram. If the bearer information contained in the information carrier matches the bearer information in the seal or security hologram, then access to the secured location may be allowed.

The transponder may be used independently of an identification card. The transponder may contain an identification code representing the bearer which may be used to obtain identification information about the bearer from a local or remote database. The identification information may be used in conjunction with a biometric evaluation system and/or displayed on a display device for visual verification. The biometric evaluation system may compare the identification information retrieved from the database to information obtained from the bearer. The display device allows a visual comparison to be made between the identification information obtained from the database and the bearer. The transponder may be in a deactivated mode until it receives an activation signal from the transceiver and may be again deactivated upon verification or at any other time.

DETAILED DESCRIPTION

Figure 1:
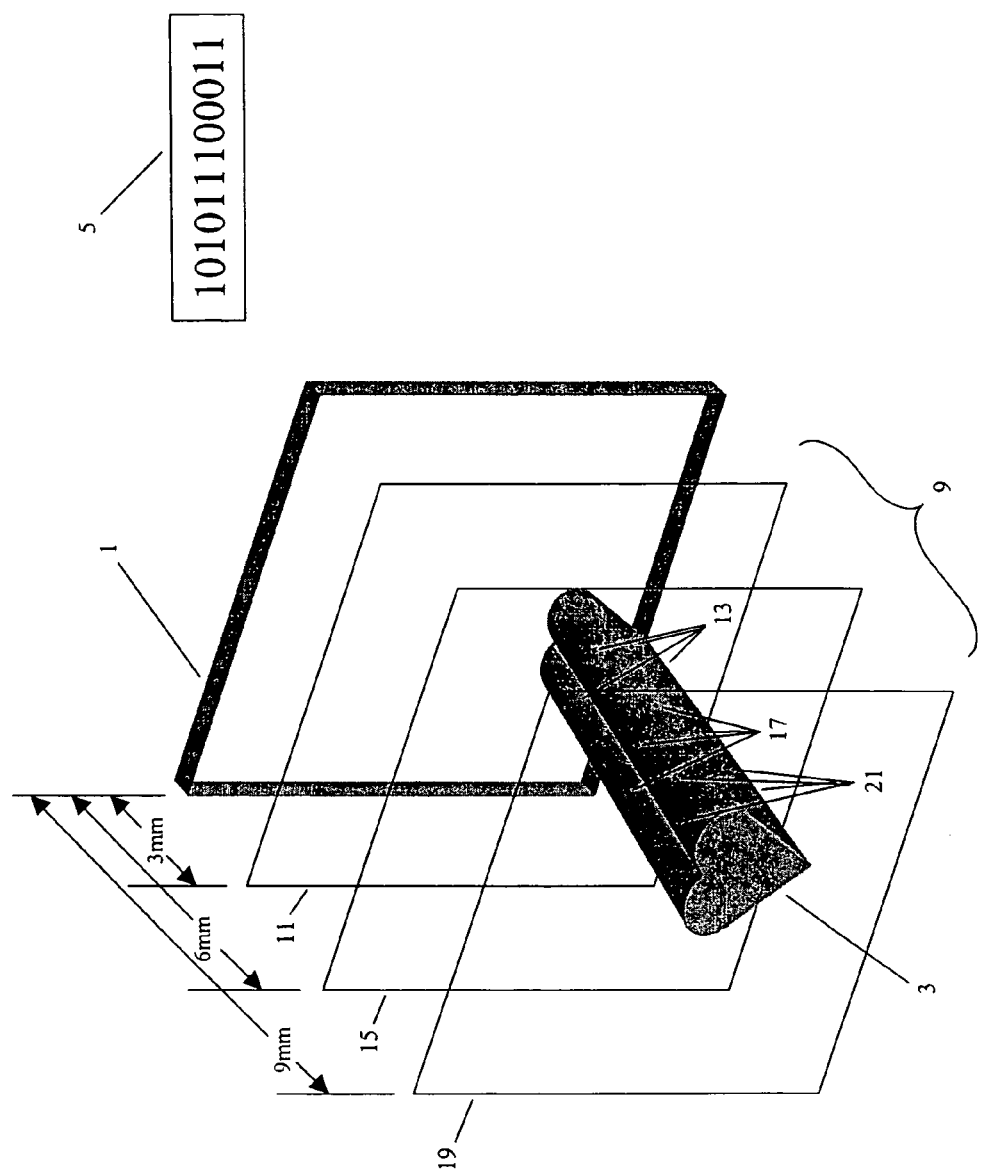
FIG. 1 shows a security hologram according to a first exemplary embodiment of the present invention.

As shown in FIG. 1, the security hologram 1 includes information that when viewed or read for verification purposes, is presented as a three-dimensional image 3. The image 3 includes coded information 5 in a predetermined pattern. This coded information 5 is arranged in a predetermined pattern that will allow for varying levels of security. The predetermined pattern of the coded information 5 is arranged as a three-dimensional matrix 9. The three-dimensional matrix 9 includes information encompassing three discrete planes each located at a predetermined distance from the plane of the security hologram 1. The first plane 11 of the three-dimensional matrix 9 is located at approximately three millimeters from the surface of the security hologram 1. This first plane 11 includes only a first portion 13 of the coded information 5 stored in the security hologram 1 and alone is insufficient to establish a successful confirmation of security clearance identity verification. The second plane 15 is located at approximately six millimeters from the surface of the security hologram 1, and includes only a second portion 17 of the coded information 5 stored in the security hologram and even together with the first portion 15 is insufficient to establish a successful confirmation of security clearance identity verification. The third plane 19 is located at approximately nine millimeters from the surface of the security hologram 1, and includes a third portion 21 of the coded information 5, the remainder of the coded information 5 necessary to establish a successful confirmation of security clearance identity verification. Not only is the coded information 5 stored in three separate planes of a three-dimensional matrix 9, each at a different distance from the security hologram 1, but the information stored in the three planes is coded according to a unique algorithm that determines the sequence according to which the information is read in the various planes to reproduce the coded information 5. The algorithm may be the same for each plane or it may be different for one or more of the planes.

Figure 2:
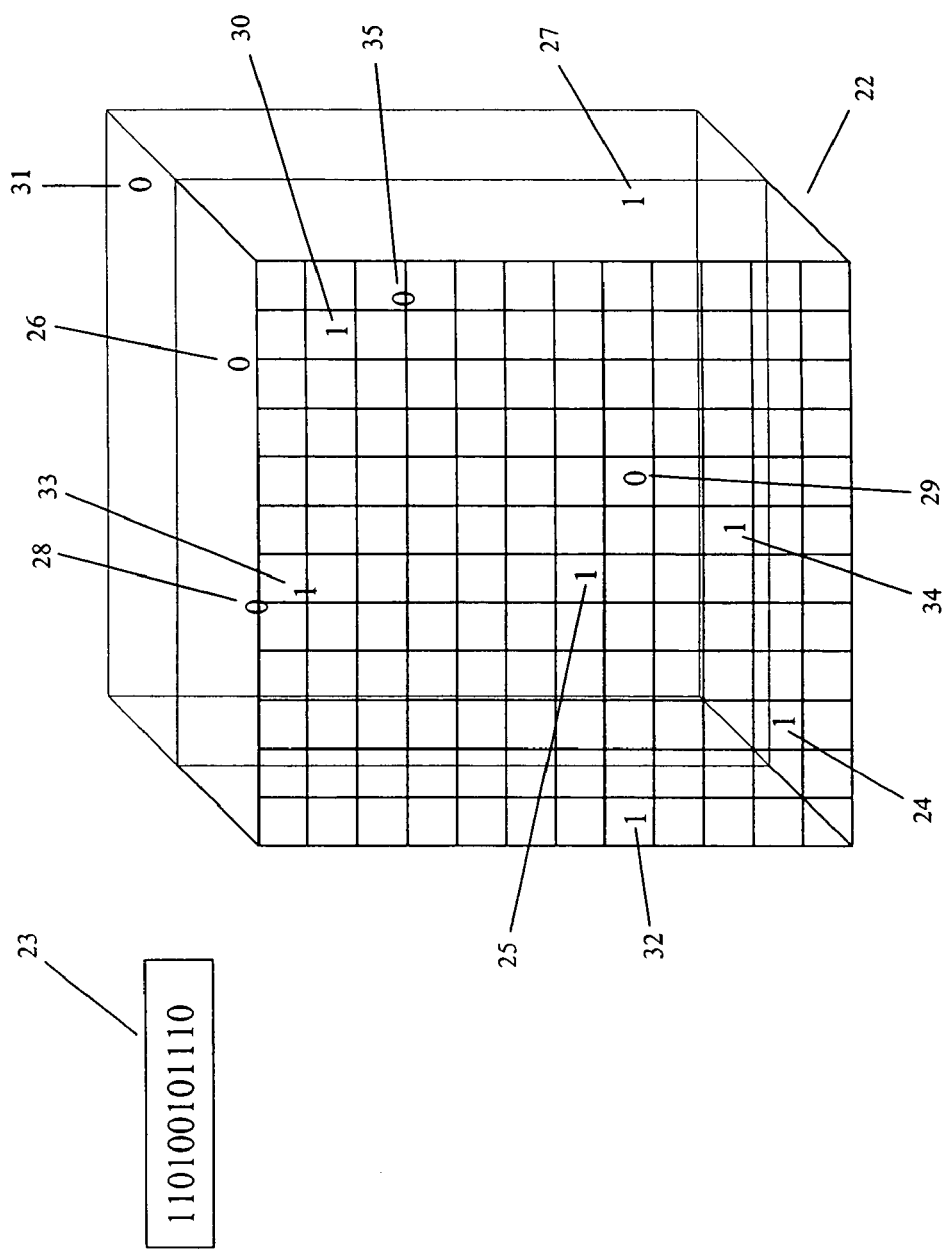
FIG. 2 shows a sequence and location for positioning data points in a matrix according to an exemplary embodiment of the present invention.

As shown in FIG. 2, processing the coded information may be accomplished using a predetermined algorithm or algorithms that determine the sequence and location of the information to be positioned in the matrix and the order in which such information should be read when security information confirmation is attempted. The matrix used in this example is a 12×12×3 matrix 22, and the security code is a twelve bit word 23. In this instance the algorithm provides for the positioning of the bits in the matrix as shown. The first bit 24 is located in position [3, 1, 1] of the matrix. The second bit 25 is located in position [6, 6, 1] of the matrix. The third bit 26 is located in position [9, 11, 2] of the matrix. The fourth bit 27 is located in position [12, 4, 2]. The fifth bit 28 is located in position [2, 9, 3] of the matrix. The sixth bit 29 is located in position [5, 2, 3] of the matrix. The seventh bit 30 is located in position [8, 7, 3] of the matrix. The eighth bit 31 is located in position [11, 12, 3] of the matrix. The ninth bit 32 is located in position [1, 5, 1] of the matrix. The tenth bit 33 is located in position [4, 10, 2] of the matrix. The eleventh bit 34 is located in position [7, 3, 1] of the matrix and the twelfth bit 35 is located in position [10, 8, 2] of the matrix.

This example, uses a simple algorithm where the first element follows a pattern of progression by three digit increments beginning with position three and cycling through twelve positions, and after every four progressions decreasing the next progression to two digits and then continuing the next four progressions by three digit increments. The second element follows a continuous progression of five digit increments cycling through twelve positions. The third element depends on the first and second element. Where the sum of the first element and second element is a positive number under twelve, the third element is a one. Where the sum of the first element and the second element is a positive number over twelve, the third element is a two. Where the sum of the first element and the second element is a negative number, the third element is a three.

Figure 3:
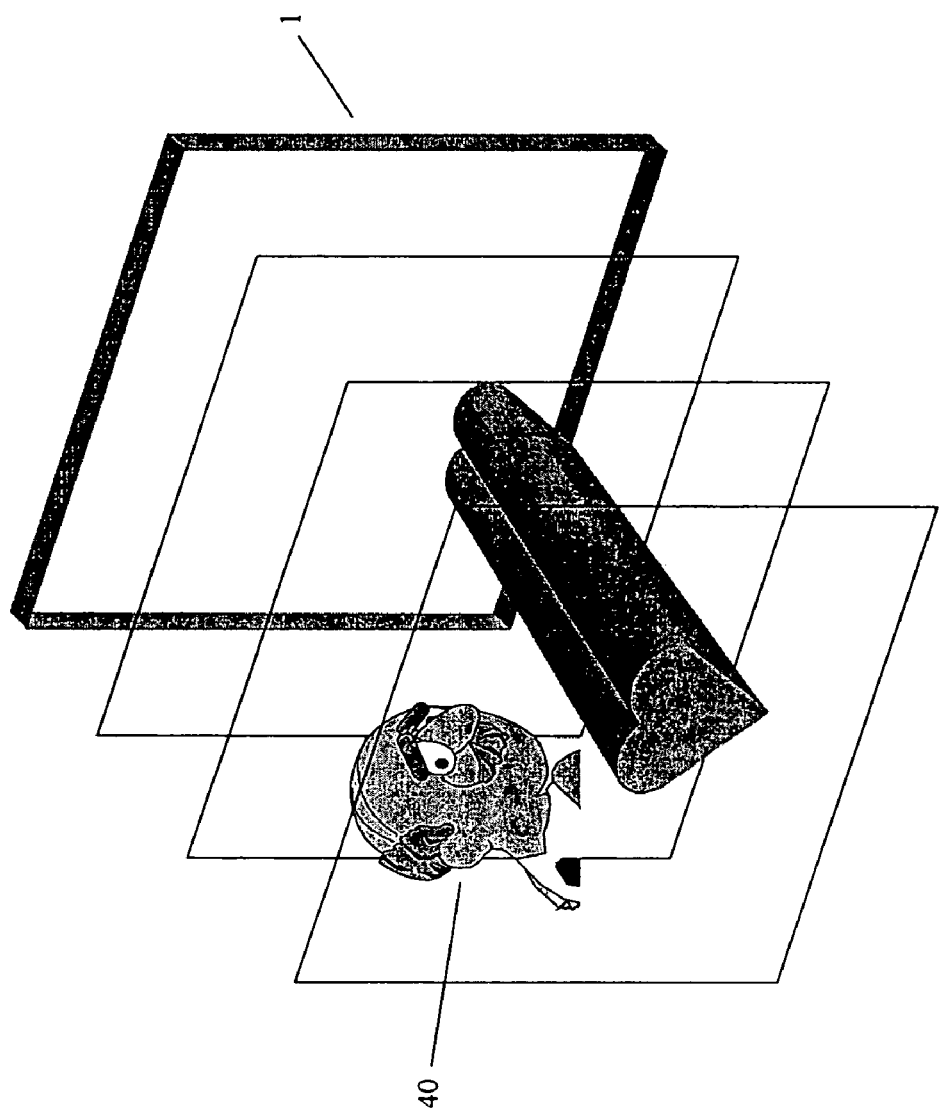
FIG. 3 shows the security hologram of FIG. 1 including additional information about the bearer according to an exemplary embodiment of the present invention.

As shown in FIG. 3, the security hologram 1 of FIG. 1 includes additional information about the issuee, such as, for example, an image of the issuee 40 and/or other personal identifying information. The image of the issuee 40 may be included as a holographic image readily viewable by an observer under natural lighting conditions or readable only by a special reader utilizing specialized lighting conditions. The image of the issuee 40 may be compared to image information stored in a remote database, at or in the reader or available to an operator. The image of the issuee 40 may be compared manually, electronically, visually or by any other method to the stored or available image information about the issuee and/or to an image of or the actual bearer of the security hologram 1. Alternatively the image of the issuee 40 may be generated as a photograph or video image from digital information stored in the security hologram 1.

Figure 4:
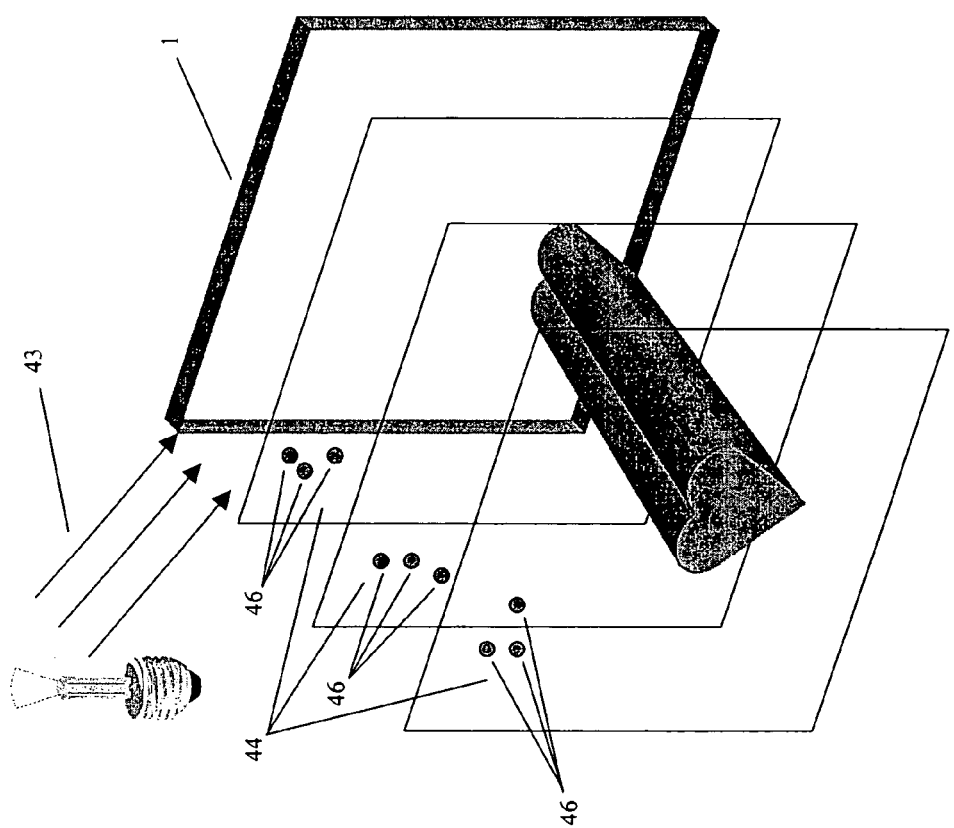
FIG. 4 shows the security hologram of FIG. 1 including additional information that is readable only using ultraviolet light according to an exemplary embodiment of the present invention.

FIG. 4 shows the security hologram 1 of FIG. 1 including additional digitized information 44 that is readable only using ultraviolet light 43 presented at a 45 degree angle to the security hologram 1. The additional digitized information 44 may be represented by spots 46 arranged in a pattern, with each spot 46 representing a digit or bit of information. The additional digitized information 44 indicates to a reader the time and date of creation of the security hologram 1. The additional digitized information 44 may be coded or embedded in a visible light portion of the security hologram 1. The additional digitized information 44 may be used as an extra security feature to confirm the authenticity of the security hologram 1. The additional digitized information 44 may be verified by comparison to data stored in a remote database, at or in the reader, or available to an operator.

Figure 5:
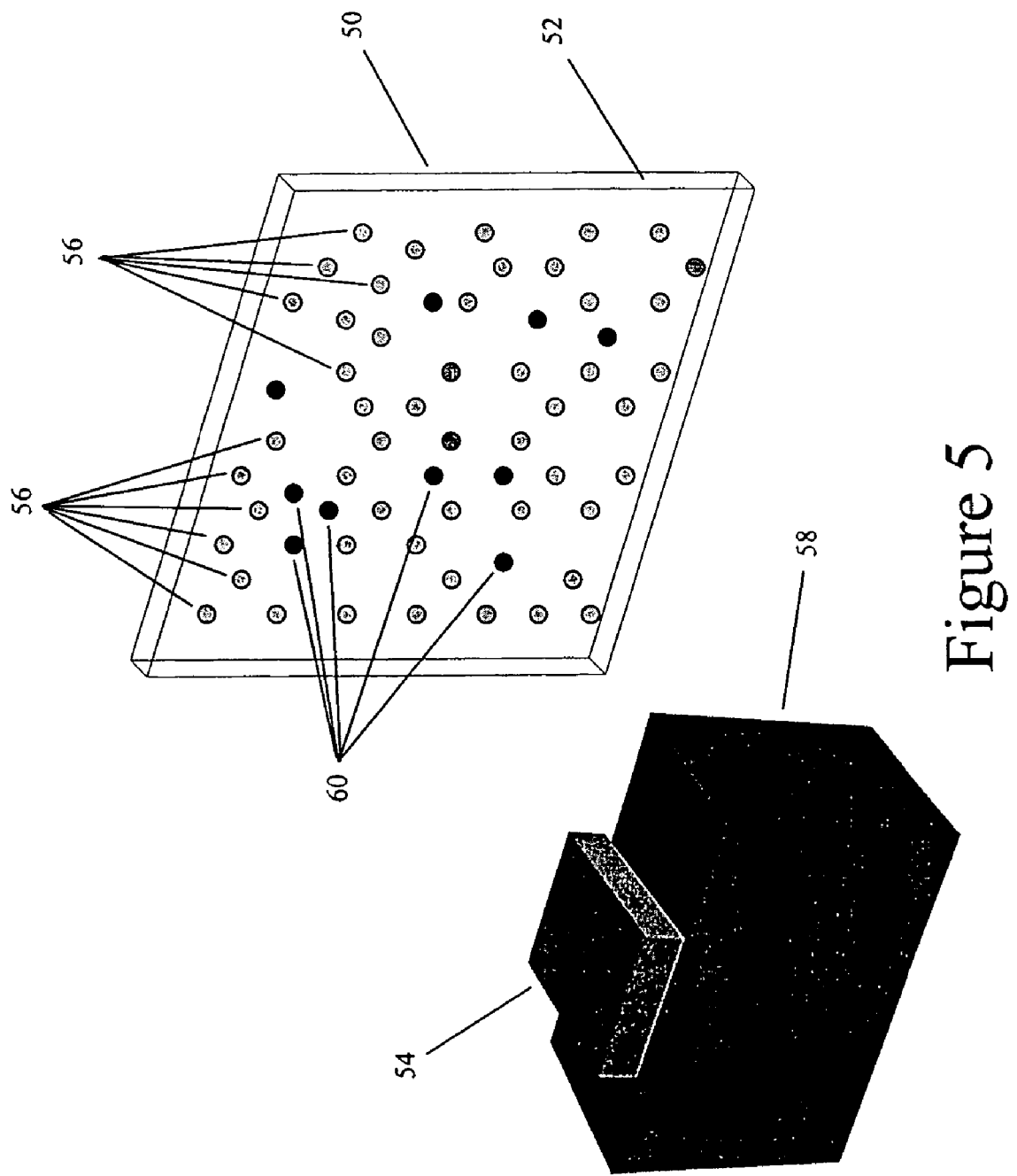
FIG. 5 shows a security hologram having a modifiable structure for varying the security code after each reading of the security hologram according to an exemplary embodiment of the present invention.

FIG. 5 shows a security hologram having a modifiable structure for varying the security code after each reading of the security hologram. The security hologram 50 is manufactured using an alterable material 52, such as, for example, fragile foil, that may be modified using a pulsed laser 54. The security hologram 50 is manufactured with a particular security code represented by a pattern of spots 56. Upon a first verified use of the security hologram 50 the verification system 58 modifies the security code by utilizing the pulsed laser 54 to burn one or more additional spots 60 in the pattern of spots 56. For every modification of the security code, the verification system updates a database with the new security code for purposes of the next verification. This process may continue for a finite number of uses, i.e., 200, such that the security hologram 50 would need to be replaced every few months, assuming a number of uses per day. Should the identification card incorporating the security hologram 50 be forged, if the forged card is utilized first, then upon use by the actual bearer, access will be denied and an automatic notification of a security breach will be provided, or such denial of access the actual bearer will be prompted to report a security breach. If the forged card is utilized second, then upon such use the forgery will be immediately detected and the system could be designed to initiate an alarm, notification or security condition. The verification system 58 may be designed such that the identification card need be presented both upon entry and upon exit. Additionally, the bearer may be provided with the additional security feature of a code that must be entered upon use, biometric information about the correct bearer or other information which would be stored in a database and verify the identity of the bearer.

Figure 6:
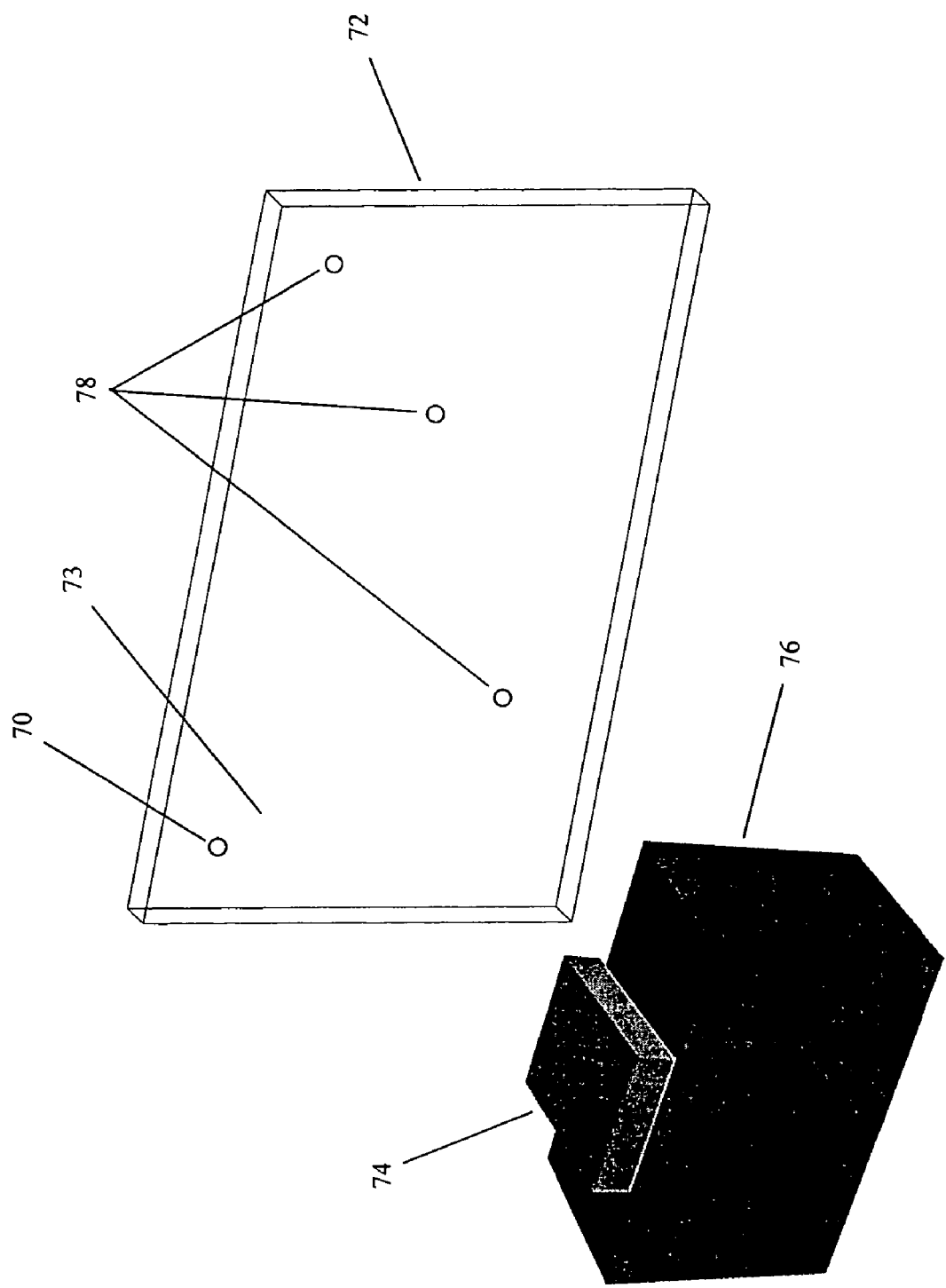
FIG. 6 shows a security hologram that includes an image that is only readable using an UV wavelength according to an exemplary embodiment of the present invention.

FIG. 6 shows a security hologram that does not bear a visible image but instead bears an image that is readable using an UV wavelength. The security hologram 70 is created using UV light and the security hologram 70 may be located in any part of the identification card 72, in the example shown it is located in the upper left quadrant 73. The security hologram may be read using a UV light source 74 in conjunction with an UV detector 76. The UV light source 74 is positioned to project UV light onto the security hologram 70 with the light reflected from the security hologram 70 being read by the UV detector 76. Alternatively, the identification card 72 may include the security hologram 70 and one or more decoy security holograms 78 located at different positions on the identification card 72, with the location of the security hologram 70 being determined by the code assigned to the bearer, biometric information about the correct bearer or other information. The security hologram 70 may be generated such that the information stored therein may only be read using light reflected at a predetermined angle or by the UV detector 76 positioned at a particular angle or distance from the security hologram 70.

Figure 7:
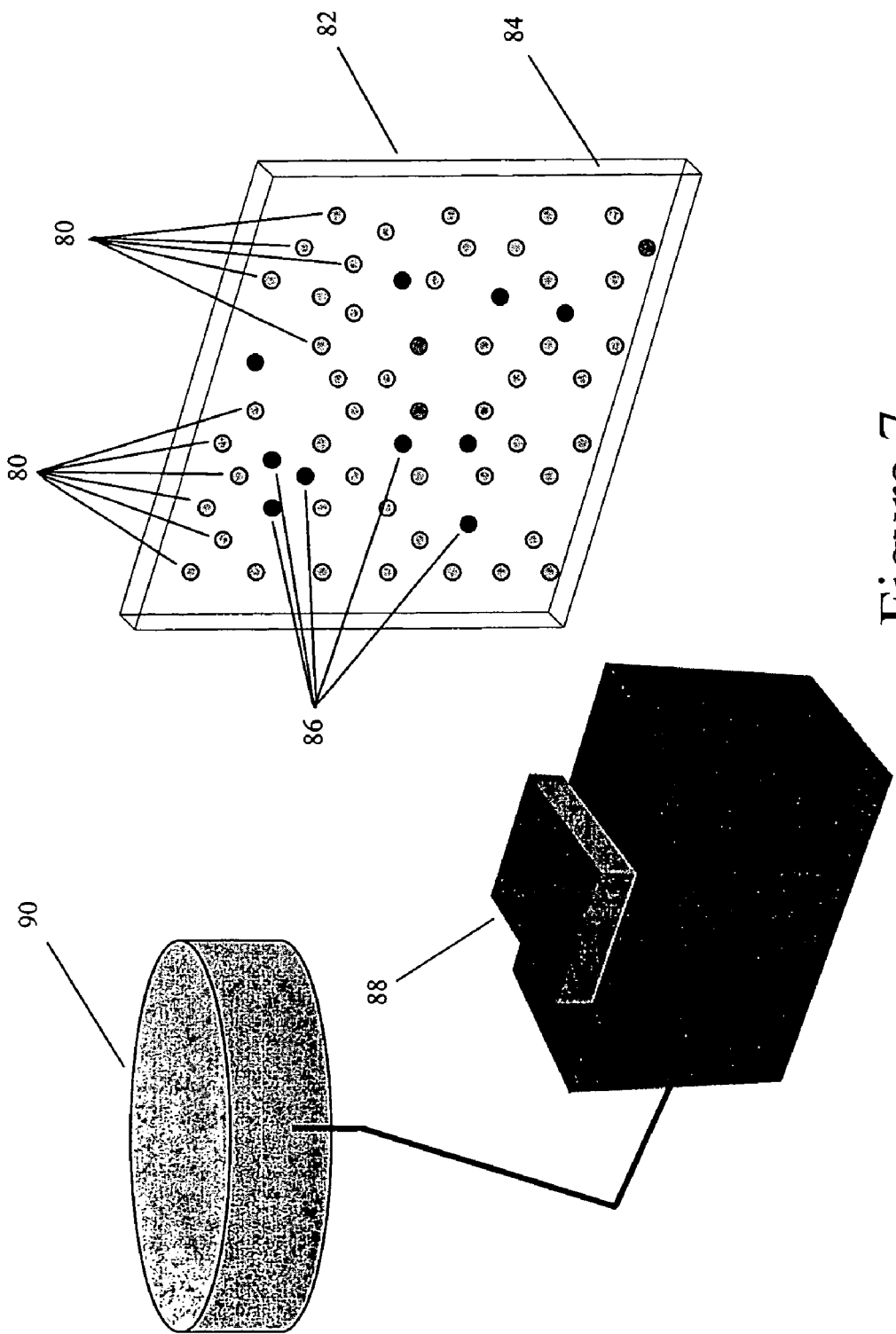
FIG. 7 shows the security hologram of FIG. 5 implemented utilizing a data subtraction function according to an exemplary embodiment of the present invention.

As shown in FIG. 7, a security hologram as described with respect to FIG. 5 may be implemented using a data subtraction function. In this embodiment a large number of data points 80 are incorporated into the security hologram blank 82 used in identification card 84. Upon activation of the identification card 84 a unique set of data points 86 are removed using a pulsed laser 88 to provide a unique code within the security hologram blank 82. This unique code may be entered into a database 90 for real-time, near real-time or delayed verification of authenticity or identity.

Figure 8:
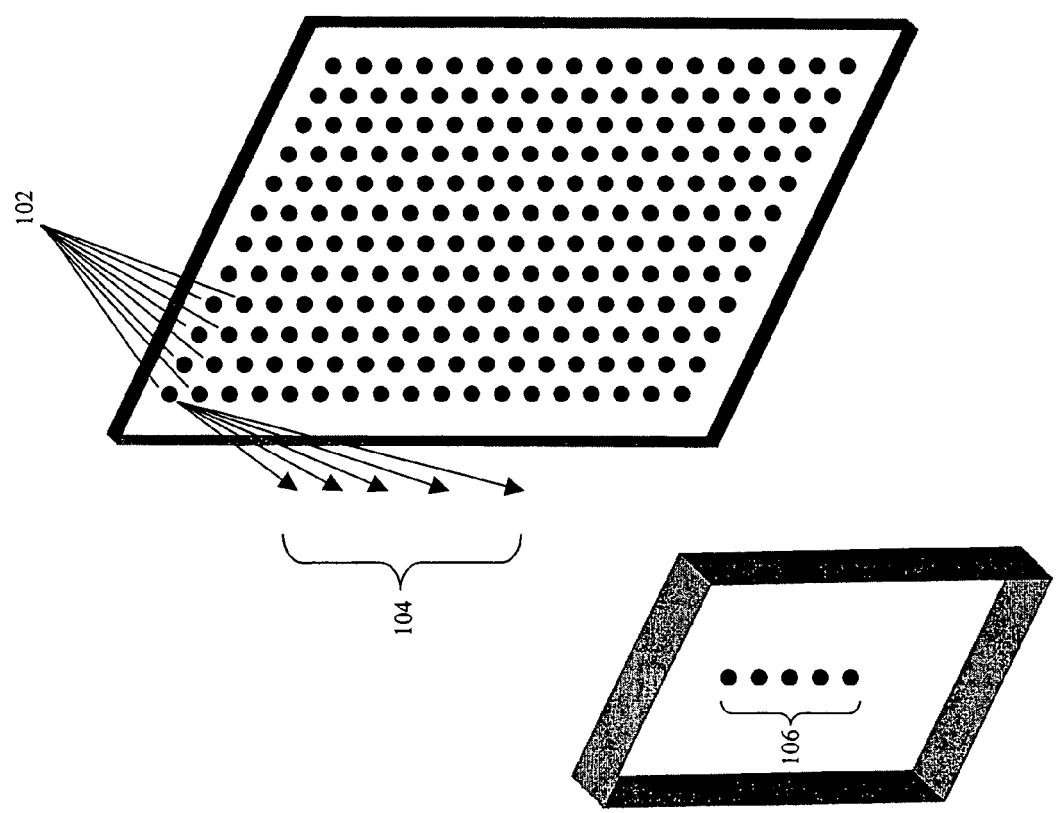
FIG. 8 shows a security hologram utilizing a plurality of reflection angles according to an exemplary embodiment of the present invention.
Figure 9:
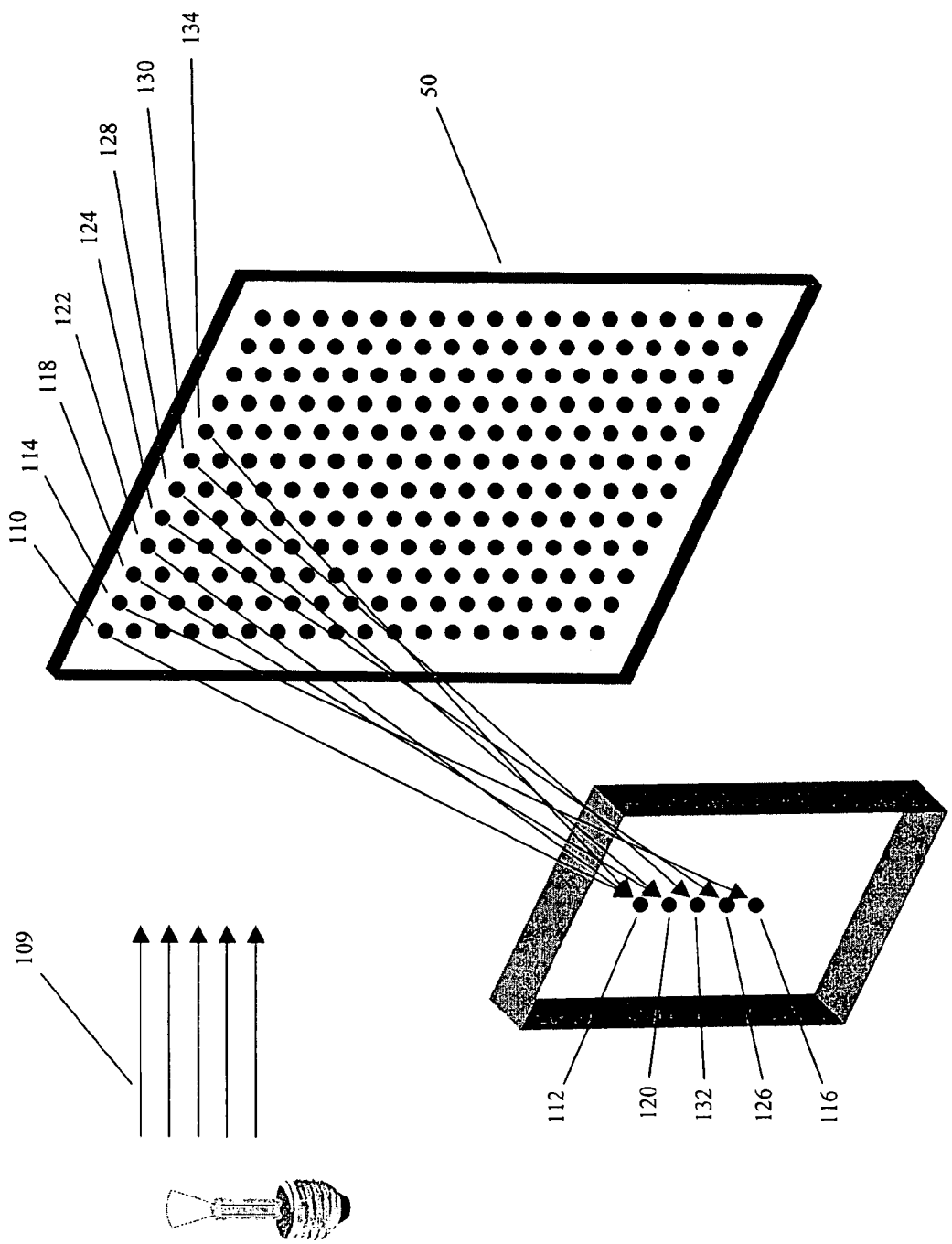
FIG. 9 shows a reflection diagram of the security hologram of FIG. 8.

FIG. 8 shows a security hologram utilizing a plurality of reflection angles according to another embodiment of the present invention. The security hologram 100 is generated by incorporating varying reflection angles 104 into the digit locations. Each digit location 102 incorporates a predetermined reflection angle such that each bit of the unique code will be reflected at a particular angle to be read by a particular detector 106. Each digit location 102 of the unique code is able to represent more than binary ones and zeros, but can represent any number of digits depending on the number of detectors 106. In this example, there are 5 detectors 106, each at a particular location with respect to the security hologram 100. Each individual digit location 102 will be reflected to a particular detector 106 thereby providing for a greater number of unique codes utilizing fewer digit locations. As shown in FIG. 9, upon illumination of the security hologram 50 by the light beam 109, the first digit location 110 is reflected to the first detector 112. The second digit location 114 is reflected to the fifth detector 116, the third digit location 118 is reflected to the second detector 120, the fourth digit location 122 is reflected to the first detector 112, the fifth digit location 124 is reflected to the fourth detector 126, the sixth digit location 128 is reflected to the second detector 120, the seventh digit location 130 is reflected to the third detector 132, and the eighth digit location 134 is reflected to the first detector 112. The eight digit code incorporated into this security hologram will contain six times as much information as a binary eight digit code utilizing a single detector with no angular differentiation, and the security hologram will be much more difficult to reproduce due to the specific and defined reflection angles required for the digits in the security hologram to allow for an accurate reading of the code.

Figure 10:
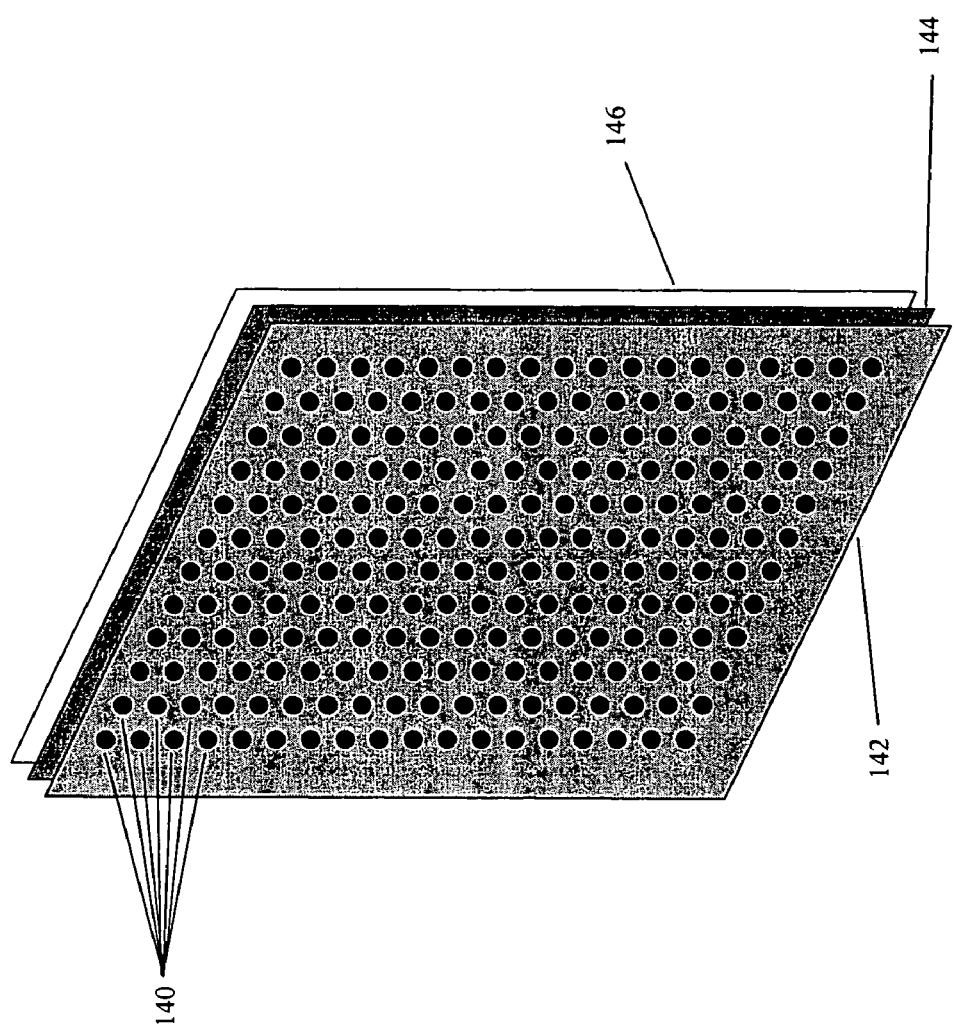
FIG. 10 shows a security hologram having a structural condition that would defeat removal or tampering according to an exemplary embodiment of the present invention.

In FIG. 10 there is shown a security hologram having a structural condition that would defeat removal or tampering. The digit locations 140 or locations where information is stored on the security hologram 142 are manufactured using a fragile foil backing 144. The fragile foil backing 144 is designed such that any attempt to remove the security hologram 142 from the identification card 146 for purposes of reproducing the hologram would destroy portions of, if not the entire security hologram 142. The fragile foil backing 144 would become effective for preventing tampering with the security hologram 142 as a result of a lamination process or other post-production process whereby the fragile foil backing may be partially embedded in or adhere to an adhesive or other material. Upon removal of the security hologram 142 from the identification card 146 the fragile foil backing 144 would be affected, with parts remaining on the security hologram 142 and parts remaining on the identification card 146.

Figure 11:
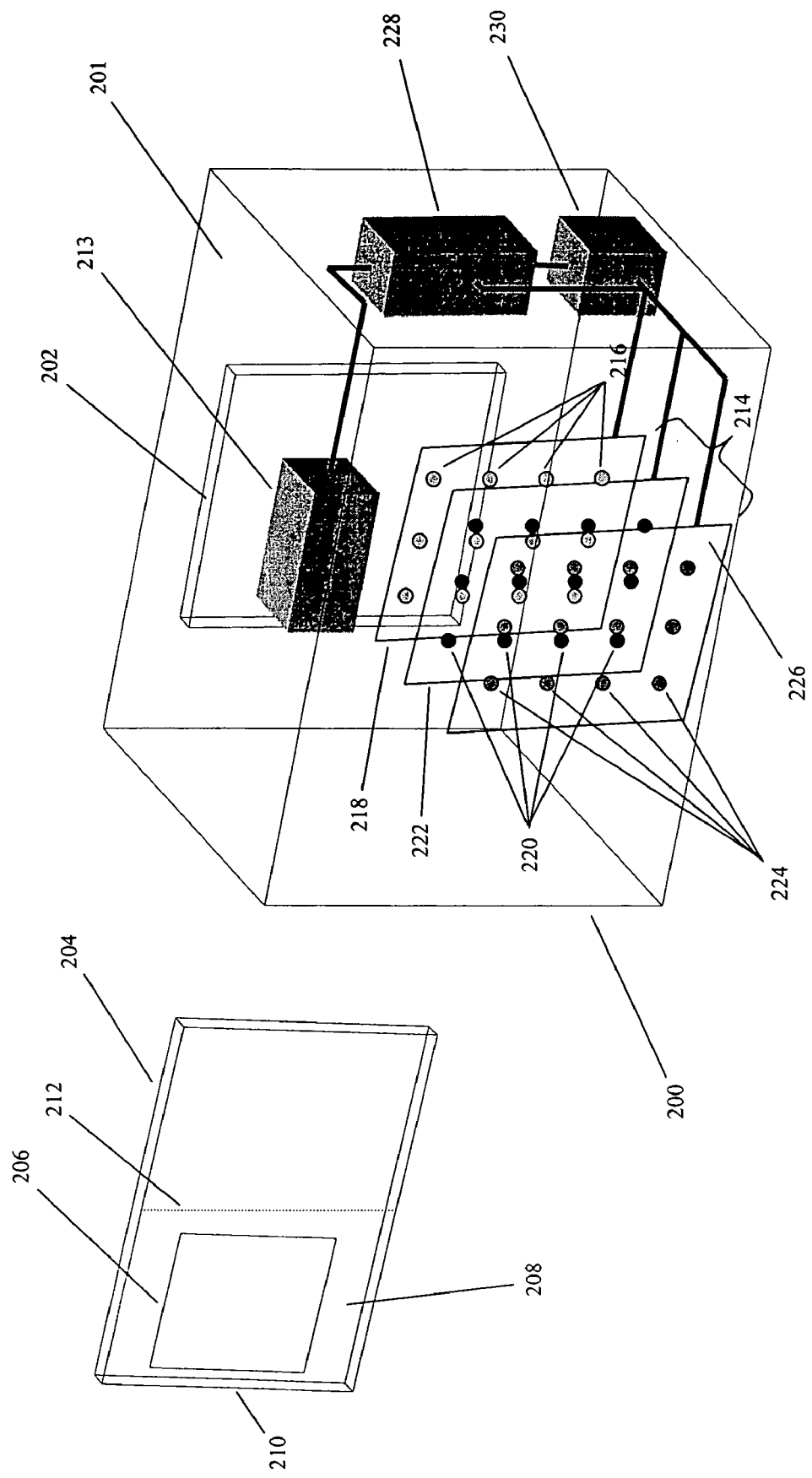
FIG. 11 shows a reader that is used for reading the coded information stored in a security hologram according to a first exemplary embodiment of the present invention.

In FIG. 11 there is shown a reader that is used for reading the coded information stored in a security hologram. The reader 200 includes a housing 201 having a slot 202 for insertion of an identification card 204. The slot 202 allows for the insertion of approximately ¾ of the length of the identification card 204 into the reader 200. The security hologram 206 should therefore be positioned within the boundaries 208 formed by an edge 210 of the card running along its width and moving in a direction toward the center line 212 of the card, lengthwise. In this embodiment, the security hologram 206 is positioned on the right side of the identification card 204. The reader 200 includes a light source 213. The reader 200 also includes a matrix of detectors 214 positioned within the housing 201 and configured in three x-y planes lying parallel to the plane of the security hologram 206 when inserted into the slot 202. A first set of detectors 216 are positioned on a first plane 218 nearest the security hologram 206. A second set of detectors 220 are positioned on a second plane 222 on the far side of the first set of detectors 216 with respect to the security hologram 206 (in the z-direction) and are located in positions on the plane corresponding to the positions of detectors from the first set of detectors 216, but slightly offset in one direction (x) from the first set of detectors 216. A third set of detectors 224 are positioned an a third plane 226 on the far side of the second set of detectors 220 with respect to the security hologram 206 (in the z-direction) and are located in positions on the plane corresponding to the positions of detectors from the first set of detectors 216 and second set of detectors 220, but slightly offset in one direction (x) from the second set of detectors 220. Alternatively, the first set of detectors 216, the second set of detectors 220 and the third set of detectors 224 may each be comprised of a detector array. The first set of detectors 216, the second set of detectors 220 and the third set of detectors are each coupled to a microprocessor 228 and to a decoder 230. The microprocessor 228 may be programmed to activate certain of the detectors depending on the date and/or time. The microprocessor 228 may process the decoded information from the decoder 230 and verify the authenticity of the security hologram 206.

Figure 12:
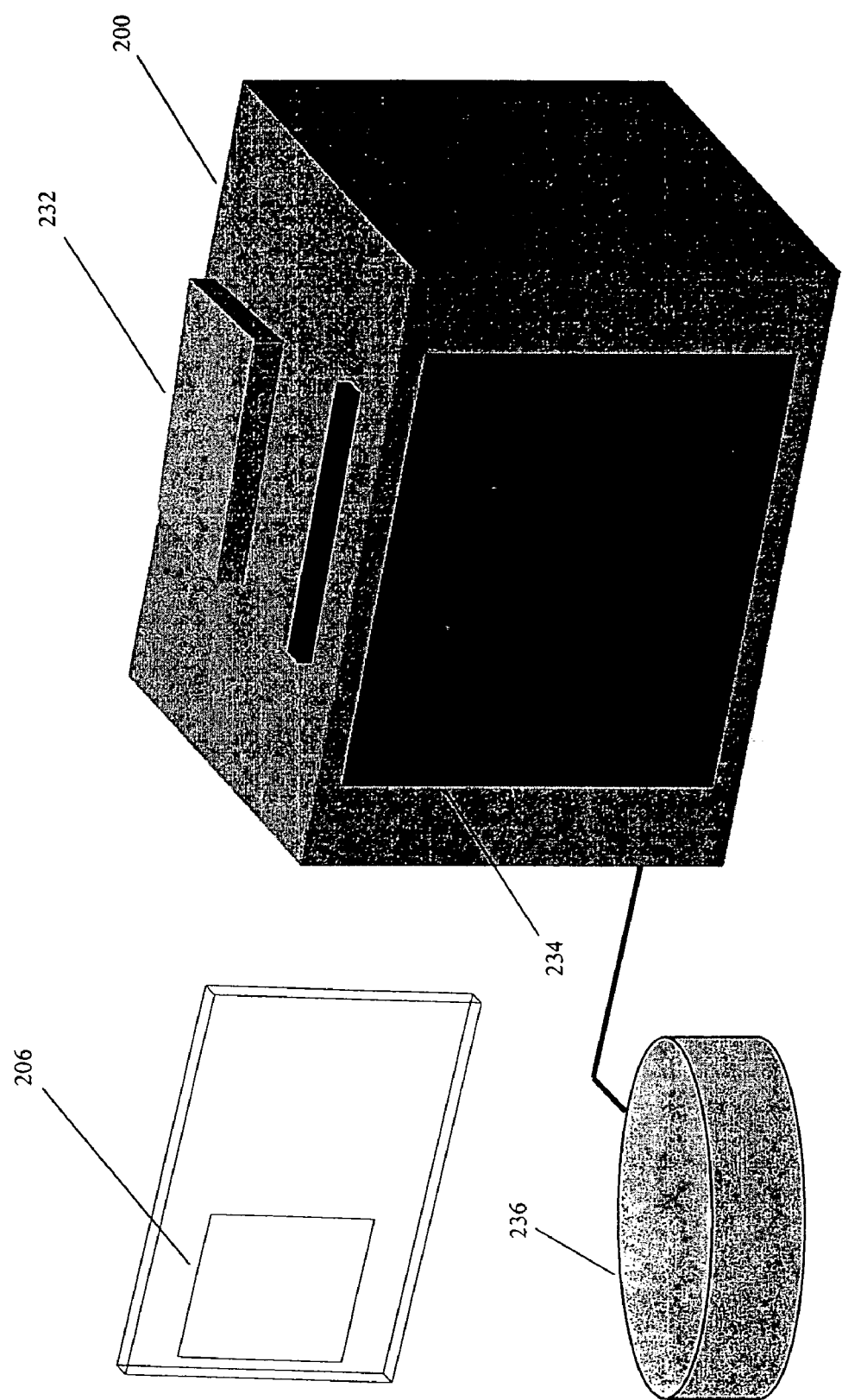
FIG. 12 shows a reader that is used for reading the coded information stored in a security hologram according to a second exemplary embodiment of the present invention.

As shown in FIG. 12, the reader 200 may include a keypad 232 for entry by the card bearer of a pin code or other verification information. Such information may be used to select the detectors to be activated for reading the security hologram 206, or the algorithm to be used for decoding the information stored in the security hologram 206. The reader 200 may also include a display 234 for viewing the picture of the bearer stored in the security hologram 206 or for viewing a picture of the bearer stored in a local or remote database 236. The display 234 may also be used for viewing and/or comparing the bearer's biometric information to that stored in the security hologram 206 and/or a local or remote database 236.

Figure 13:
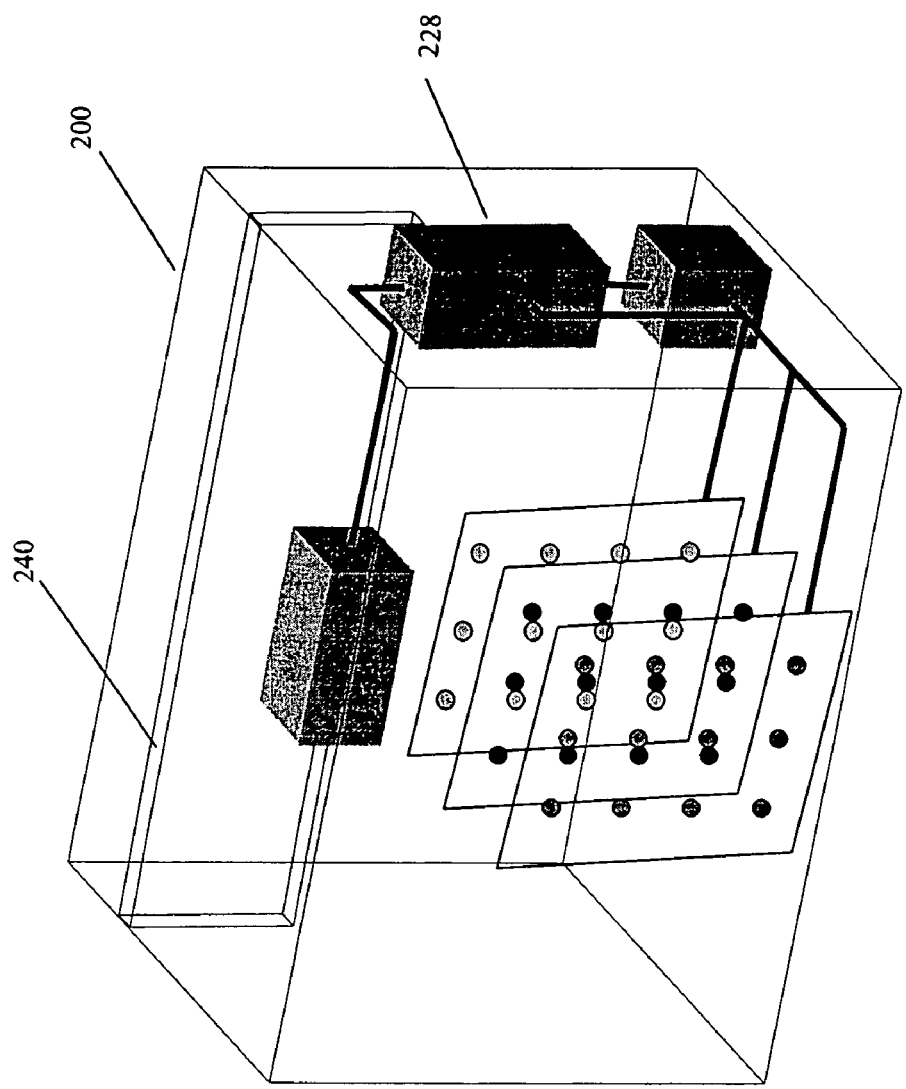
FIG. 13 shows a reader that is used for reading the coded information stored in a security hologram according to a third exemplary embodiment of the present invention.
Figure 13:
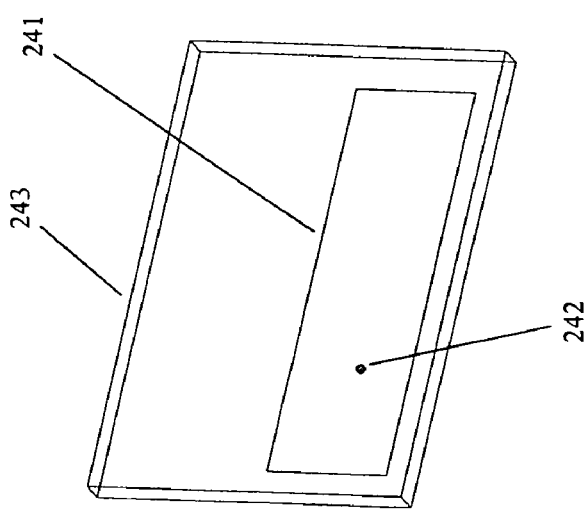

Alternatively, as shown in FIG. 13, the reader 200 may include a slit 240 in place of slot 202. The slit 240 allows the bearer to slide the identification card 243 along the slit 240 which in turn allows the detectors to read the information from the security hologram 241. The detectors may be positioned as described with respect to FIG. 11, with the security hologram being read serially instead of in parallel. A serial reading of the security hologram 241 using the reader 200 of FIG. 13 may include a flash point 242 at a random position on the security hologram 241 which is read during a swipe of the identification card 243 through the slit 240. At the flash point 242 all of the digits corresponding to the detectors to be activated by the coded information are read resulting in a collective activation of all of the relevant detectors. This flash point 242 can be decoded by the microprocessor 228 and used as a further verification of the authenticity of the security hologram 241.

Figure 14:
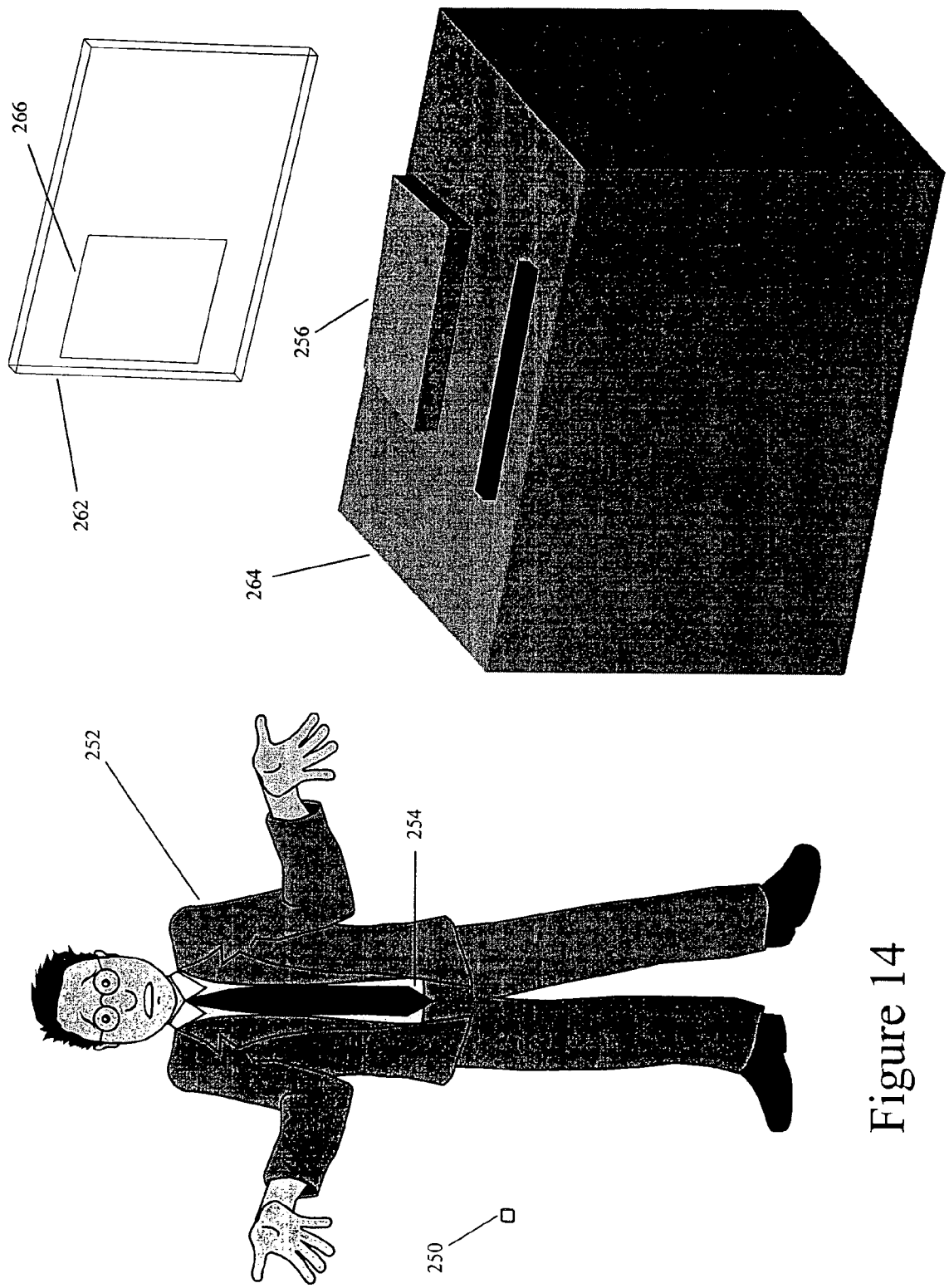
FIG. 14 shows a transponder system according to a first exemplary embodiment of the present invention.

As shown in FIG. 14, an added level of security may be incorporated into the system according to the present invention through the use of a transponder embedded in the bearer. A transponder 250 is embedded under the skin of the bearer 252 in the abdominal region 254. The transponder 250 does not transmit any signals until it receives a coded activation signal from a transceiver 256 at the entry point of the secure area upon scanning of the identification card 262 by a reader 264. Upon receiving the activation signal the transponder 250 begins emitting a signal that matches the code in the security hologram 266 on the identification card 262. Upon verification of the identification information in the security hologram 266 or upon exit of the bearer 252 from the secure location the security code on the security hologram 266 may be modified by the reader 264 or an independent code modification device and the security code in the transponder 250 may be modified by the transceiver 256 or by the independent code modification device. Upon verification of the identification information in the security hologram 266 and/or upon exit of the bearer 252 from the secure location the transponder may be deactivated by the transceiver 256 or the independent code modification device.

Figure 15:
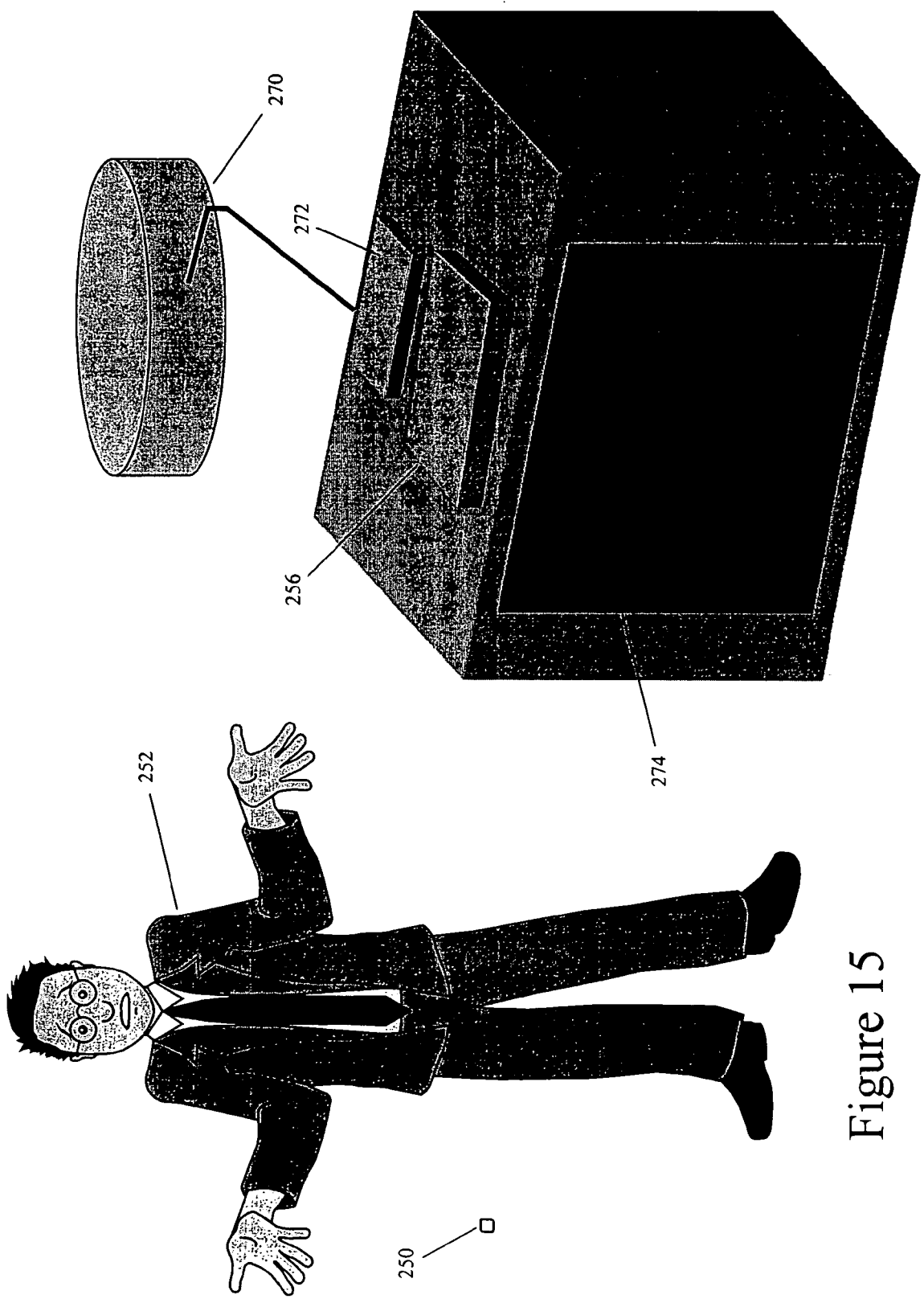
FIG. 15 shows a transponder system according to a second exemplary embodiment of the present invention.

The transponder 250 may be used independently of an identification card as shown in FIG. 15. The transponder 250 may contain an identification code representing the bearer 252. The transceiver 256 relays the identification code to a database 270 containing identification information about the bearer 252. The identification information may be loaded into a biometric evaluation system 272 and/or displayed on a display device 274 for visual evaluation. The biometric evaluation system 272 compares the identification information retrieved from the database 270 to information obtained in real time from the bearer 252. The display device 274 allows a visual comparison to be made between the identification information obtained from the database 270 and the bearer 252. The transponder 250 may be in a deactivated mode until it receives an activation signal from the transceiver 256 and may be again deactivated upon clearance of the bearer 252.

What is claimed is:

1. A device for limiting the reproducibility of information, comprising:
   a substrate; and
   a holographic element coupled to the substrate, the holographic element including within a planar area defined by the holographic element a first set of optical information in a first coded pattern and including within one or more portions of the planar area defined by the holographic element a second set of optical information in a second coded pattern that is positioned in superimposed relationship with the first coded pattern, wherein the superimposed first coded pattern and second coded pattern results in a pattern of light.

2. The device according to claim 1, wherein each of the first coded pattern and the second coded pattern are determined using a single algorithm.

3. The device according to claim 1, wherein each of the first coded pattern and the second coded pattern are determined using independent algorithms.

4. The device according to claim 1, wherein the first set of optical information is embedded throughout the planar area defined by the holographic element using a photolithographic process.

5. The device according to claim 1, wherein the second set of optical information is included on one or more portions of the planar area defined by the holographic element using a printing process.

6. The device according to claim 1, wherein the second set of optical information is included on one or more portions of the planar area defined by the holographic element using a solvent based surface deformation process.

7. The device according to claim 1, wherein the second set of optical information is included within one or more portions of the planar area defined by the holographic element using laser disruption of a volume of the holographic element.

8. The device according to claim 1, wherein the second set of optical information is included within one or more portions of the planar area defined by the holographic element using a photolithographic process.

9. A system for authentication of information, comprising:
a holographic element, the holographic element including within a planar area defined by the holographic element a first set of optical information in a first coded pattern and including within one or more portions of the planar area defined by the holographic element a second set of optical information in a second coded pattern that is positioned in superimposed relationship with the first coded pattern, wherein the superimposed first coded pattern and second coded pattern results in a pattern of light; and
a reader, including
an aperture, the aperture defining a first location at which the reader can accomplish a reading of the holographic element,
a light source,
a detector positioned at a second location relative to the holographic element when the holographic element is at the first location.

10. The system according to claim 9, wherein the reader further comprises a microprocessor coupled to the light source, and the detector.

11. The system according to claim 9, wherein the detector comprises an array of detectors.

12. The system according to claim 9, wherein the aperture is defined by a slot through which the holographic element is passed.

13. The system according to claim 9, wherein the aperture is defined by a slot into which the holographic element is inserted.

14. The system according to claim 9, wherein the aperture is defined by a window positioned proximate to the holographic element.

15. The system according to claim 9, wherein the first location is defined by a predetermined range of distances and orientations.

16. The system according to claim 9, wherein the second location is defined by a first distance and a first orientation.

17. The system according to claim 9, wherein the light source is a first light source, and further comprising a second light source.

18. The system according to claim 17, wherein the first light source and the second light source provide different wavelengths of light.

19. The system according to claim 9, further comprising a second detector positioned at a third location relative to the holographic element when the holographic element is at the first location.

20. The system according to claim 19, wherein the third location is defined by a second distance and a second orientation.

21. The system according to claim 17, wherein the reader further comprises a microprocessor coupled to the first light source, the second light source, and the detector.

22. A method for authenticating information, comprising:
positioning a holographic element and a reader one relative to the other, the holographic element comprising a first set of optical information in a first coded pattern within a planar area defined by the holographic element and a second set of optical information in a second coded pattern within one or more portions of the planar area defined by the holographic element that is positioned in superimposed relationship with the first coded pattern, wherein the superimposed first coded pattern and second coded pattern results in a pattern of light, and the reader comprising an aperture, the aperture defining a first location at which the reader can accomplish a reading of the holographic element, a light source, a detector positioned at a second location relative to the holographic element when the holographic element is at the first location;
detecting the pattern of light;
analyzing the pattern of light; and
outputting a signal representing a result of the analysis.

* * * * *